Patented July 25, 1933

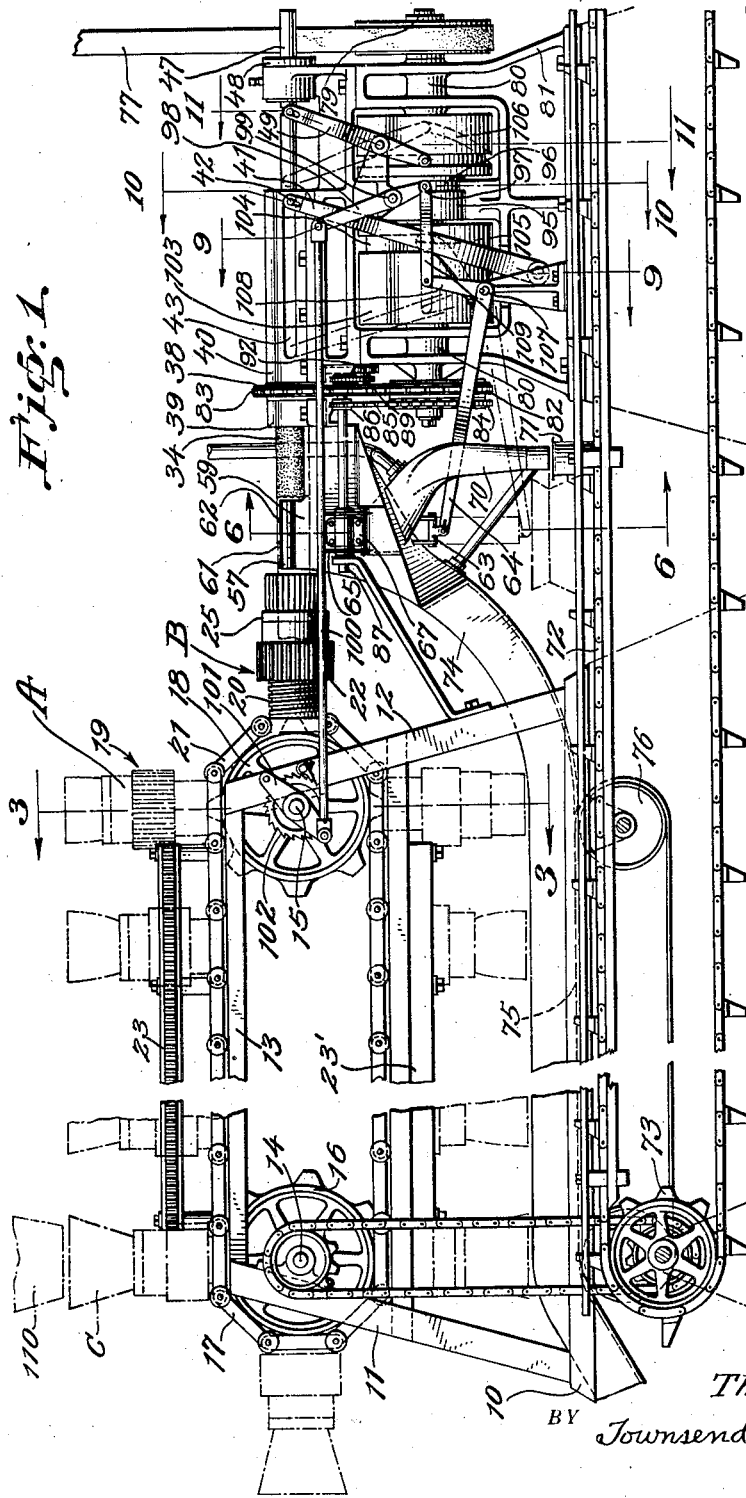

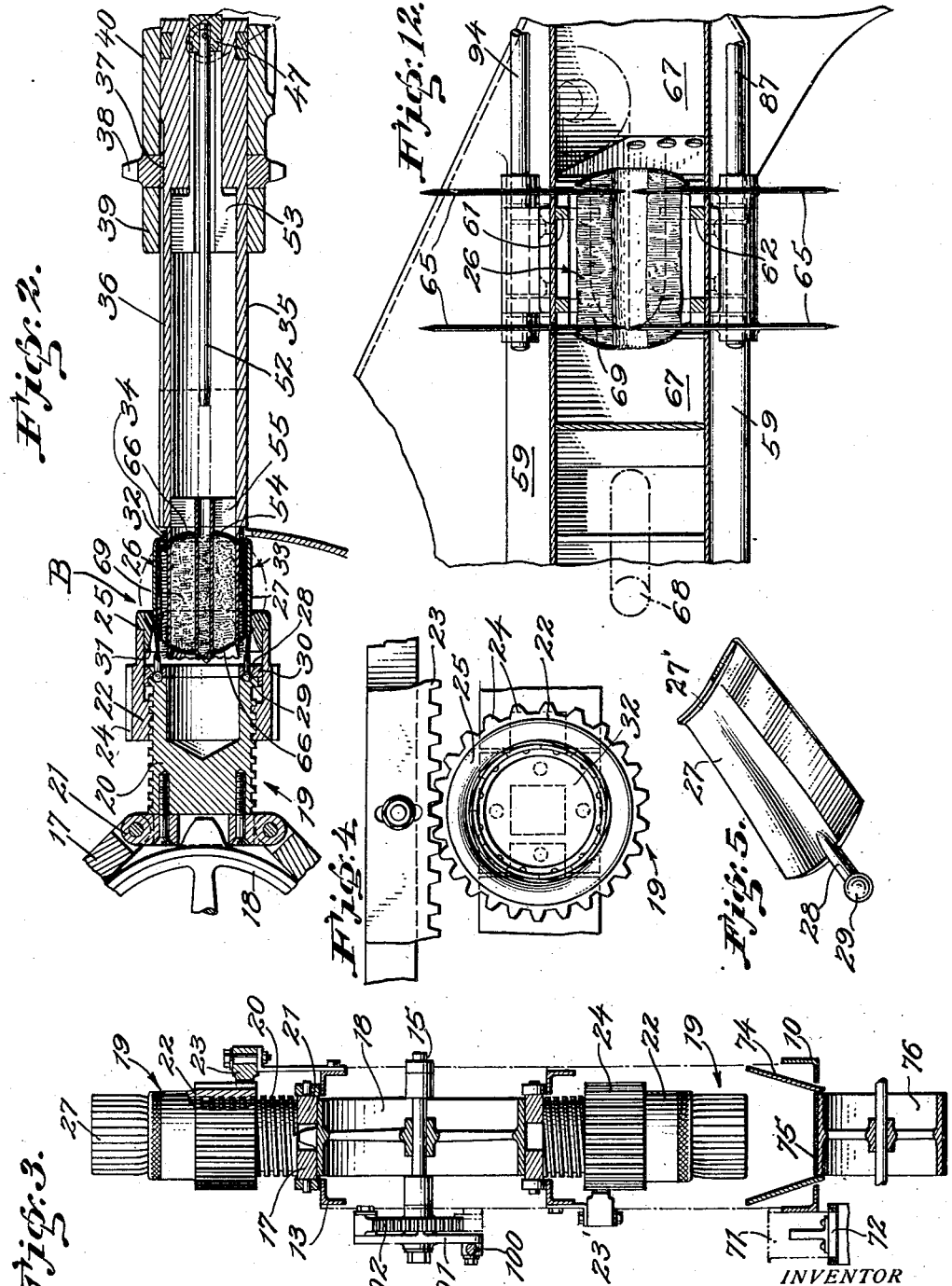

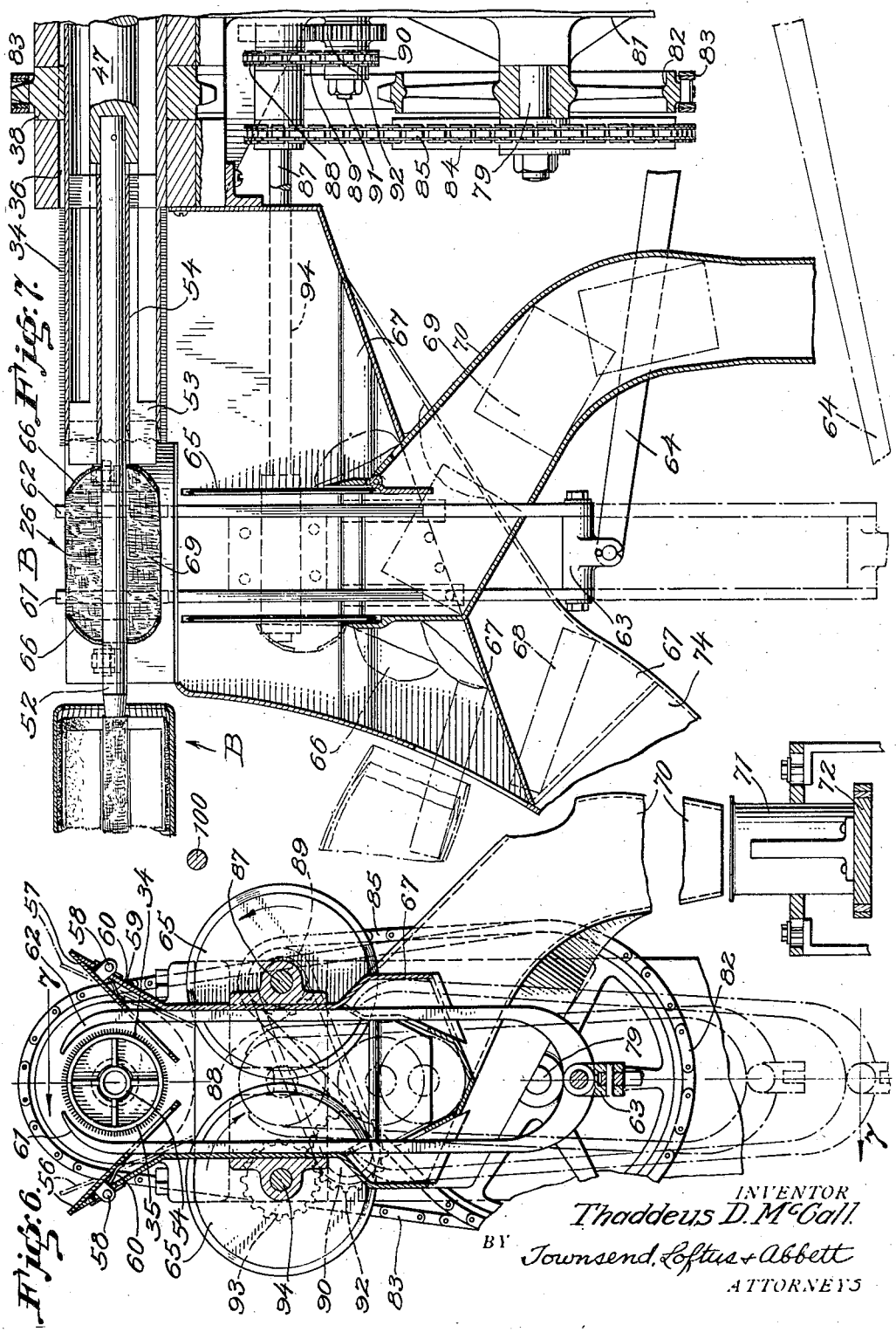

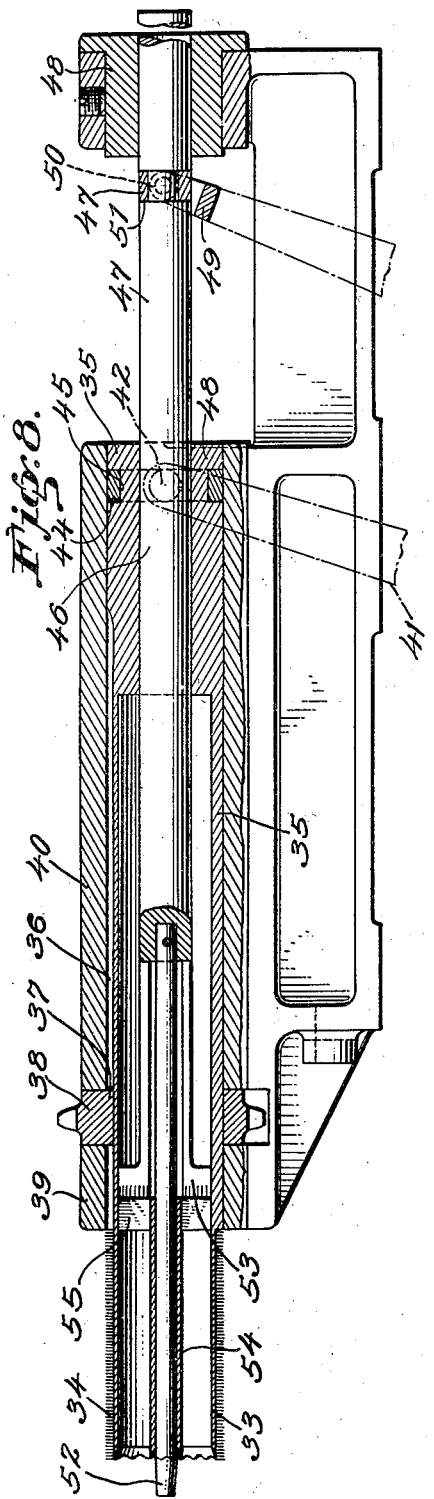

1,920,095

UNITED STATES PATENT OFFICE

THADDEUS D. McCALL, OF IMPERIAL, CALIFORNIA

CITRUS FRUIT TREATING MACHINE

Application filed June 12, 1931. Serial No. 543,756.

This invention relates to fruit treating apparatus and particularly pertains to means for removing the rind from citrus fruit, and otherwise preparing the fruit for canning. In order to can citrus fruit and the like it is desirable to remove the rind and otherwise treat the fruit by machinery so that the operation may be satisfactorily and rapidly accomplished in order to make the canning commercially profitable, and it is the principal object of the present invention to provide a machine into which citrus fruit may be fed and by which the rind of the fruit may be removed, as well as the core of the fruit, so that the fruit will be of a desired shape and in a suitable condition for direct canning, at the same time providing means to insure that the juice from the fruit will be conserved, all of which operations take place automatically and consecutively without direct manual aid.

The present invention contemplates the provision of a machine having a plurality of traveling fruit receiving members by which the fruit may be gripped and held while the rind and the core is being removed from them and which mechanism will thereafter act to place the prepared fruit in a can ready for sealing.

The invention is illustrated by way of example in the accompanying drawings in which:

Figure 1 is a view in side elevation showing the complete machine with parts broken away for the sake of convenience.

Fig. 2 is a view in central horizontal section through the machine showing the initial operation to remove the rind.

Fig. 3 is a view in central vertical section, as seen on the line 3—3 of Fig. 1, showing the position of the conveyor chain with relation to its sprocket and individual fruit chucks thereon.

Fig. 4 is an enlarged view in plan showing one of the fruit chucks and the manner in which it is rotated.

Fig. 5 is a view in perspective showing one of the chuck jaws disassociated from the chuck.

Fig. 6 is a view in transverse vertical section through the machine as seen on the line 6—6 of Fig. 1.

Fig. 7 is a view in transverse section on the line 7—7 of Fig. 3 showing the means by which a portion of the rind is removed from the fruit.

Fig. 8 is an enlarged view in longitudinal vertical section showing the initial peeling and coring process.

Fig. 9 is a view in transverse vertical section through the operating mechanism as seen on the line 9—9 of Fig. 1.

Fig. 10 is a view in transverse section through the driving mechanism as seen on the line 10—10 of Fig. 1.

Fig. 11 is a view in transverse section of the driving mechanism as seen on the line 11—11 of Fig. 1.

Fig. 12 is a view in plan showing the partially peeled fruit and the relation of the final peeling knives thereto.

Referring more particularly to the drawings, 10 indicates a base carrying uprights 11 and 12 which are secured together at their upper ends by horizontal frame members 13. Secured near the top of the uprights 11 and 12 are shafts 14 and 15. The shaft 14 is fitted with a sprocket wheel 16 around which an endless conveyor chain 17 is led. The shaft 15 is fitted with a sprocket wheel 18 also around which conveyor chain 17 is led. The chain is intended to be intermittently operated for a purpose which will be hereinafter described and by mechanism to be hereinafter described. Mounted upon various links of the chain and preferably arranged in equi-spaced relation to each other along the length thereof are fruit chuck units 19 into which individual articles of fruit are fed and by which the fruit is held while it is being treated in the machine. These chucks are shown in detail in Figs. 2 to 5, inclusive, where it will be seen that they comprise a barrel 20 which is secured to a link 21. The exterior of the barrel is threaded to receive a nut 22 which may be screwed on to the barrel and off thereof by a rack 23 disposed along the path of travel of the chucks and engaged by gear teeth 24 and arranged around the nut. At the outer end of the nut is a bushing 25 which fits into the open mouth of the nut and into which an article of fruit 26 may be positioned. Extending outwardly through the opening in the bushing and arranged circumferentially within the nut is a series of chuck jaws 27 formed with shanks 28 at their one ends, as shown in Fig. 5, the shanks terminating in an enlarged head 29 which fits in a socket at the end of the barrel 20 and is held by a retaining plate 30. By this arrangement the chuck jaws 27 are articulately connected to the end of the barrel and as the nut is screwed back and forth the bushing 25 which has an inner tapered face 31 will act to contract or expand the jaws, as the case may be.

The jaws 27 are in the shape of relatively thin blades which when assembled around the article of fruit will form an outer central opening 32 into which a cylindrical cutting blade 33 may be inserted. This blade has a sharpened forward edge wall and a relatively thin side wall, making it possible for the circular blade to cut its way through the fruit while it is held by the chuck and to cut the fruit so that it is substantially cylindrical with its circumference devoid of rind, although the opposite ends of the cylinder of fruit still retains its rind. The body portion of the cylindrical blade 33 is formed with a brush 34 having relatively short stiff bristles which will act within the severed wall of rind to brush out the pulp and thus extract any juice which might be otherwise wasted. The cylindrical peeling cutter 33 is mounted upon a feed tube 35 and horizontally reciprocates therewith. The feed tube is provided with a keyway 36 into which a spline 37 extends. This spline is carried by a sprocket 38 mounted between bearing 39 and 40. The tube 35 is caused to reciprocate by a lever arm 41 which oscillates along side of the bearing 40 and engages a pin 42 extending outwardly through a longitudinal slot 43 in the bearing and which is carried by a collar 44 mounted in a groove 45 formed around the rear end of the tube 35. The rear end of the tube 35 is formed with a central passageway 46 through which a stripping rod 47 may reciprocate independently of the reciprocation of the tube 35. The stripping rod is longitudinally aligned in the center of the tube 35 and its outer end is reciprocably mounted in bearings 48. A yoke 49 carries rollers 50 within a groove 51 of the stripping rod 47 whereby oscillation of the yoke 49 will be accompanied by reciprocation of the rod. Mounted at the end of the stripper rod is a core ejector 52 and a fruit ejector 53. The core ejector is adapted to be forced centrally through a cylindrical core knife 54 which is disposed within and concentrically of the cylindrical cutter 33 previously described. This core knife is supported by a transverse web 55 within the tube 35, and upon opposite sides of which the fruit ejector arms 53 may move as they follow the core ejector 52 and force the fruit from its empaled position upon the core knife 54 and within the cylindrical cutting knife 33. As shown in Figs. 1 and 7 of the drawings the jaws move to a position in longitudinal alignment with the cylindrical cutters and the tube 35, at which time the coring and initial peeling operation will take place. The fruit will then be positioned between the inclined sideboards 56 and 57 as shown in Fig. 6 of the drawings. These sideboards are pivoted at 58 upon the housing 59 of the machine and are yieldably held with their lower ends in the path of travel of the ejected fruit by springs 60, the dotted line positions of the sideboards being indicated in Fig. 6. Disposed around the fruit at this position are a pair of feed arms 61 and 62 which have hooked upper ends adapted to partially extend over and embrace the partially peeled fruit, and to continue downwardly to be pivoted to the opposite ends of a cross head 63 which is carried by a vertically oscillating rocker arm 64, and by which the article of fruit may be drawn downwardly and into the throat formed between pairs of circular cutters 65 as shown in Figs. 6 and 7 where the unpeeled rind may be cut from the ends 66 of the cylinders of fruit. This rind will fall from the opposite ends of the fruit into a trap 67 which also receives the cores 68 of the fruit, while permitting a cylindrical fruit body 69 to pass through a chute 70 to a canning station where the fruit will be deposited in a can 71. The cans are here shown as being carried upon an endless conveyor 72 which passes beneath the machine and around sprockets 73, one of which is shown in the drawings. The cores 68 and the end sections of rind 66 are conveyed along a chute 74 to a suitable receiving station, and in fact may be carried into a squeezing machine as shown in my co-pending application Serial No. 543,757 executed by me on the 13th day of May, 1931, and filed concurrently herewith.

As shown in Fig. 3 of the drawings, the chute 74 has a bottom formed by an endless conveyor belt 75 which leads around pulleys 76 and by which the material is conveyed along the the horizontal portion of the chute. The driving mechanism is not shown in the drawings, but power is transmitted to the machine through a belt 77 leading around a pulley 78. This pulley is mounted upon a horizontally extending shaft 79 carried in bearings 80 of a base structure 81. The shaft 79 carries a relatively large sprocket 82 around which a sprocket chain 83 is led. This chain also passes around the sprocket 38 splined upon the cutter tube 35. A second sprocket 84 is secured upon the end of the shaft 79 and receives a sprocket chain 85 which is led around a relatively small sprocket 86 carried upon a shaft 87. The shaft 87 is provided with a pair of the disc cutters 65. This shaft also carries a sprocket wheel 88 receiving a chain 89 which passes around a sprocket wheel 90 on a stub shaft 91. A gear 92 is carried upon the shaft and is driven by the sprocket 90, and is in mesh with gear 93 carried upon a cutter shaft 94 parallel to the cutter shaft 87 and upon which another set of disc cutters 65 are mounted. This insures that the knives will rotate in opposite directions thereby acting uniformly upon the article of fruit while cutting the same. The conveyor chains 17 and 72 are intended to operate intermittently. This is accomplished by a cam 95 mounted upon the shaft 79 and formed with a suitable cam groove 96 to receive a rocker pin 97. The pin 97 is secured to one end of a rocker arm 98 which is pivoted intermediate its ends upon a fulcrum point 99. The free end of the rocker arm 98 receives a pitman rod 100 secured to a clutch arm 101 which is provided to engage a ratchet wheel 102 carried upon the shaft 15. The clutch arm 101 may oscillate to engage the ratchet wheel 102 and move it a distance as required to advance a chuck 19 from the position indicated at A in Fig. 1 to the operating position indicated at B in the same figure, which is here shown as representing a character of the revolution of the sprockets 16 and 18.

A drum cam 103 is carried on the main drive shaft 79 and is formed with a cam groove 104 receiving a roller 105 of the lever 41. The groove in this case is of a suitable configuration to oscillate the lever 41 and to cause the cylindrical cutting knife 33 and its accompanying core cutting knife 54 to be reciprocated and to be forced into the article of fruit and to be thereafter withdrawn therefrom. A cam 106 is also mounted upon the main drive shaft 79 and is formed with a groove to produce oscillation of the shifting yoke 49 which moves in synchronism with the tube 35 and causes the stripping rod 52 to be forced into the cylindrical core cutter 54 and to thus cause the core to be ejected from the end of the cutter. This action also causes the fingers 53 to force the partially peeled fruit from off of the core cutter and the cylindrical peeling knife 33. The final peeling operation by which the hemispherical ends of rind 66 are cut from the fruit is accompanied by oscillation of lever 64 which is mounted upon a pivot 107 and is swung by a lever 108 connected to the rocker arm 98 by a link 109.

In operation, an article of fruit such as citrus fruit is fed to the machine through a chute 110 and is deposited in the funnel shaped receptacle formed by the outwardly spread and flaring chuck jaws 37 at the station C as indicated in Fig. 1. The chuck which has received the article of fruit is then advanced horizontally as the conveyor chain 17 is intermittently moved by increments. The gear teeth 24 on the nut 22 of the chuck will then engage the gear rack 23 causing the nut to be rotated around the chuck barrel 20 and to move outwardly therealong. As the nut is thus screwed outwardly its bushing 25 will force against the outer walls of the chuck jaws 27 causing these jaws to simultaneously swing inwardly embracing the fruit and holding the same for subsequent operations. By the time the chuck with is fruit reaches the station A the fruit will be firmly gripped and securely held so that as the chuck swings downwardly from the vertical line position at station A to the horizontal line position at station B the fruit will be properly held and presented for the initial peeling operation and coring operation. When the chuck with its fruit reaches the station B it is to be understood that the cams upon the shaft 79 are arranged in synchronism so that after the chuck has become longitudinally aligned with the cylindrical cutter 33 it will remain stationary while the cutter is projected into the fruit to remove a circumscribing band of rind and at the same time to permit the brush 34 to remove any pulp which might be left in the severed band of rind.

As the cylindrical cutter 33 moves into the fruit the core cutter 54 will also move into the fruit and will pass centrally of the core from stem to bud, severing the core completely from the interior of the body of fruit. The cams and levers will then act to retract the two cutters 33 and 54 while simultaneously projecting the stripper rod 52 and the fingers 53 forwardly to remove the core from the center of the core knife and the fruit from the center of the peeling knife 33. While this operation is taking place the fruit is at station B, more particularly indicated in Figs. 6 and 7 of the drawings. Here it will be seen that the core will retract from the chuck drawing the fruit with it and supporting it upon the core stripper rod 52. At this time the partially peeled fruit will stand between the pairs of fingers 61 and 62 and when the stripper rod 52 is withdrawn from the fruit these fingers will pull the fruit downwardly deflecting the sideboards 56 and 57, and drawing the fruit into engagement with the sets of cutting knives 65 where the remaining portion of rind is cut from the fruit, as indicated at 66. The fruit will then fall into the chute 70 passing endwise into a can 71 which is present upon the conveyor belt 72. The core 68 and pieces of rind 66 will pass downwardly through the chute 74 and on to the conveyor belt 75 which will also receive the band of rind carried down with the chuck and ejected when the chuck is released as it travels along the lower run of conveyor chains. This releasing action is brought about by engagement of the gear teeth 24 with a lower gear rack 23' which rotates the nut 22 in a reverse direction from its rotation above the conveyor, and causes the chuck jaws 27 to be released and to swing free.

Attention is particularly directed to the feature whereby the blades 27 will act to deform the fruit and force it to a substantially cylindrical shape so that a maximum amount of rind may be removed by the knife. It is also apparent that by forming an end flange 27' the rind will be effectually retained in the chuck as the cutter is withdrawn. The fruit to be treated may be of different grade sizes in which instance the bushings 25 may be changed to accommodate them.

It will thus be seen that by the structure here disclosed it is possible to completely peel and core articles of citrus fruit without the use of manual labor, and to deposit the final product in cans ready for sealing and shipping. It will be further observed that by the structure here disclosed all of the juice will be conserved and the peeling operation may be accomplished without any great waste of desirable fruit.

While I have shown the preferred form of my invention, as now known to me, it will be understood that various changes may be made in combination, construction, and arrangement of parts by those skilled in the art without departing from the spirit of my invention as claimed.

Having thus described my invention, what I claim and desire to secure by Letters Patent is:

1. A fruit peeling machine, comprising an endless conveyor, a chuck carried thereby and adapted to grip an article of fruit incident to its peeling, means acting to cause said gripping action as the chuck advances to the peeling station, an intermittant drive for said conveyor whereby the chuck will come to rest momentarily at said peeling station, a cylindrical cutting knife adapted to reciprocate in synchronism with said conveyor when the chuck with its fruit reaches the peeling station whereby said knife may pass into the chuck and through the fruit to remove a band of rind therefrom, means releasing said fruit, and cutting means subsequently operating to sever the unpeeled ends from the fruit.

2. A fruit peeling machine, comprising an endless conveyor, a chuck upon the conveyor designed to contract around an article of fruit and to hold the same, an intermittent drive for said conveyor moving the chuck to a position of rest at said peeling station and then moving it away therefrom, means whereby the chuck will assume its contracted position as it advances to a peeling station, a cylindrical peeling knife adapted to be reciprocated into and out of the chuck at the peeling station whereby a circumferential band of rind will be severed from the fruit, a cylindrical coring knife concentrically disposed with relation to the peeling knife and passing through the fruit simultaneously therewith, means for withdrawing the fruit from the chuck while upon the peeling knife, means for ejecting the fruit from the peeling knife and releasing the fruit from the chuck, and means for subsequently severing the unpeeled ends from the fruit.

3. In a citrus fruit peeling machine, a cutting knife having a cylindrical body terminating in a sharpened circular cutting edge, the body carrying bristles to remove material from the severed portion of rind produced when the cutter passes through an article of fruit.

4. In a citrus fruit peeling machine, a cutting knife having a cylindrical body terminating in a sharpened circular cutting edge, the body carrying bristles to remove material from the severed portion of rind produced when the cutter passes through an article of fruit, and means for simultaneously rotating and reciprocating said knife.

5. In a fruit peeling machine comprising an endless conveyor, a plurality of chucks carried thereby and adapted to receive articles of fruit, and means disposed along the path of travel of the chucks to cause said chucks to contract as they move to a peeling station, and means for causing the chucks to expand as they move from said peeling station.

6. A fruit peeling machine comprising an endless conveyor, a plurality of chucks thereon adapted to move successively to a peeling station, means for intermittently operating said conveyor to cause it to intermittently move a predetermined distance, means for causing said chucks to contract as they move to the peeling station, a reciprocating and rotating cylindrical cutter in alignment with a chuck at the peeling station and adapted to move into and out of the article of fruit held by the chuck at said station and for removing the peeled fruit from the chuck, cutting means acting at right angles to said cylindrical cutter for severing the unpeeled ends from the fruit, and feed members for drawing the fruit into the path of said cutting means.

7. A fruit peeling machine comprising an endless conveyor, a plurality of chucks thereon adapted to move succcessively to a peeling station, means for intermittently operating said conveyor to cause it to intermittently move a predetermined distance, means for causing said chucks to contract as they move to the peeling station, a reciprocating and rotating cylindrical cutter in alignment with a chuck at the peeling station and adapted to move into and out of the article of fruit held by the chuck at said station and for removing the peeled fruit from the chuck, cutting means acting at right angles to said cylindrical cutter for severing the unpeeled ends from the fruit, feed members for drawing the fruit into the path of said cutting means, and means for separating the peeled body of fruit and the rind after the peeling operation.

8. A fruit peeling machine comprising an endless conveyor, a plurality of fruit chucks carried thereon, said conveyor being arranged to have upper and lower horizontal runs, means acting as a chuck passes along the upper horizontal run to cause the chuck to grip an article of fruit, a peeling station at the end of the upper horizontal run, a reciprocating peeling knife adapted to enter the fruit presented by a chuck thereto and to cut the rind therefrom, means removing the fruit from the chuck, means removing the fruit from the peeling knife, and for releasing the peeled fruit, and means in the path of said released fruit acting to cut the unpared ends of the fruit.

THADDEUS D. McCALL.